(No Model.)

J. A. ASPINWALL.
SAIL WAGON.

No. 299,317.   Patented May 27, 1884.

WITNESSES:
Chas. Nies
C. Sedgwick

INVENTOR:
J. A. Aspinwall
BY Munn & Co.
ATTORNEYS.

United States Patent Office.

JOHN A. ASPINWALL, OF BAY RIDGE, NEW YORK.

SAIL-WAGON.

SPECIFICATION forming part of Letters Patent No. 299,317, dated May 27, 1884.

Application filed March 24, 1884. (No model.)

*To all whom it may concern:*

Be it known that I, JOHN A. ASPINWALL, of Bay Ridge, in the county of Kings and State of New York, have invented certain new and useful Improvements in Sail-Wagons, of which the following is a full, clear, and exact description.

Reference is to be had to the accompanying drawings, forming part of this specification, in which similar letters of reference indicate corresponding parts in both the figures.

Figure 1:
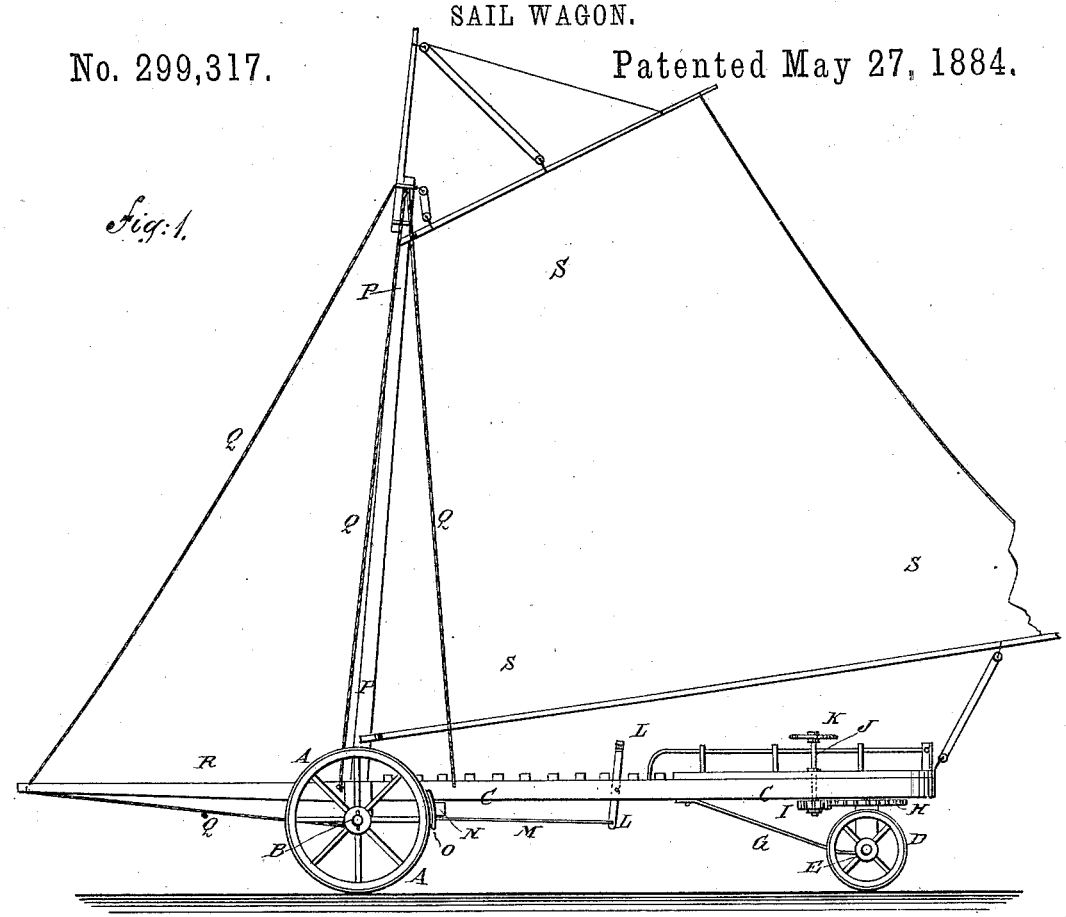
Figure 2:
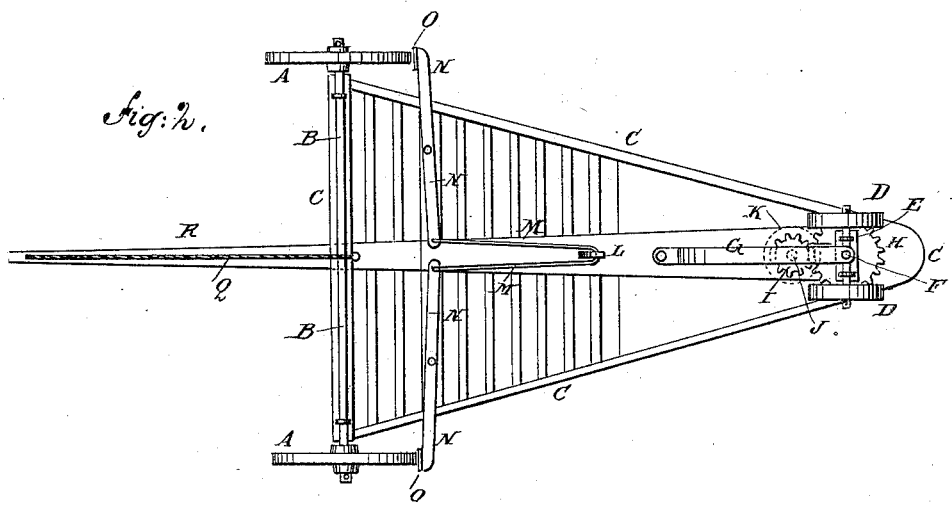

Figure 1 is a side elevation of my improvement. Fig. 2 is an under side view of the same.

The object of this invention is to provide wagons constructed in such a manner that they can be driven by the wind.

The invention consists in a sail-wagon constructed with a mast, stay-ropes, bowsprit, and sail to receive the wind gear-wheels and an upright shaft for guiding the wagon, and a lever, connecting ropes, chains, or rods, and levers provided with brake-shoes for controlling the speed, as will be hereinafter fully described.

A are the forward wheels, the long axle B of which is attached to the wide forward end of the triangular frame C.

D are the rear wheels, the short axle E of which is pivoted by a king-bolt, F, to the narrow rear end of the frame C. The king-bolt F is strengthened in position by a brace, G, the rear end of which is attached to the lower end of the said king-bolt, and its forward end is attached to the frame C in front of the rear axle, E.

To the short axle E is attached a large gear-wheel, H, into the teeth of which mesh the teeth of a smaller gear-wheel, I, attached to the lower end of the short vertical shaft J. The shaft J is pivoted in bearings attached to the frame C, and to its upper end is attached a hand-wheel, K, or a tiller, by means of which the gear-wheels I H can be operated to turn the axle E to one or the other side in guiding the wagon.

To the middle part of the frame C is pivoted an upright lever, L, which is provided at its upper end with a cross-head, so that it can be operated with the hands or feet.

To the lower end of the lever L are attached the ends of two cords, chains, or rods, M, the other ends of which are attached to the inner ends of two levers, N. The levers N are pivoted at their middle parts to the frame C, in such positions that the brake-shoes O, attached to the outer ends of the said levers, can be brought into contact with the rear sides of the wheel A, so that the brakes can be applied to control the velocity of the wagon by operating the lever L.

To the middle forward part of the frame C is attached the lower end of a mast, P, which is secured in position by stay-ropes Q, attached to its upper end, and to the frame C and to a bowsprit, R, attached to the said frame. The mast P is provided with a sail, S, and appliances for raising, lowering, and controlling the said sail in the same manner as an ordinary sail-boat. With this construction the wagon can be driven at great speed by the wind, and can be driven with, on, or against the wind, where the beach or road is hard, with as much effect as can any sail-boat on the water, and can be readily guided and controlled.

If desired, the gear-wheels H I, shaft J, and hand-wheel K can be dispensed with, and a rudder passed through the frame C, attached to the axle E, and operated by a tiller attached thereto.

Having thus described my invention, I claim as new and desire to secure by Letters Patent—

1. In a sail-wagon, the combination, with the triangular frame C, provided with mast P and sails S, and the forward axle, B, provided with wheels A, of the short rear axle, E, pivoted to the rear end of said frame and provided with the wheels D, and means for turning the said short axle on its pivot for guiding the wagon, substantially as herein shown and described.

2. In a sail-wagon, the combination, with the triangular frame C, of the forward axle, B, attached to the wide forward end of the said frame, the wheels A, the pivoted rear axle, E, the wheels D, the gear-wheel H on the rear axle, the gear-wheel I, and the upright shaft J, substantially as herein shown and described.

3. In a sail-wagon, the combination, with the triangular frame C, mounted on wheels A D, of the lever L, pivoted in a slot of the said frame, the levers N, pivoted to the underside of the frame and provided with brake-shoes O on the outer ends, and the rods M, connected to the inner ends of the brake-levers and to the operating-lever, substantially as herein shown and described.

J. A. ASPINWALL.

Witnesses:
 LOUIS HAAS,
 B. F. OLIVEROS.